(12) United States Patent
Yoo

(10) Patent No.: US 11,330,320 B2
(45) Date of Patent: May 10, 2022

(54) DISPLAY DEVICE AND METHOD FOR CONTROLLING DISPLAY DEVICE

(71) Applicant: SAMSUNG ELECTRONICS CO., LTD., Suwon-si (KR)

(72) Inventor: Ji-won Yoo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 554 days.

(21) Appl. No.: 16/326,489

(22) PCT Filed: Jun. 28, 2017

(86) PCT No.: PCT/KR2017/006819
§ 371 (c)(1),
(2) Date: Feb. 19, 2019

(87) PCT Pub. No.: WO2018/043895
PCT Pub. Date: Mar. 8, 2018

(65) Prior Publication Data
US 2021/0306694 A1    Sep. 30, 2021

(30) Foreign Application Priority Data

Aug. 31, 2016   (KR) .......................... 10-2016-0111976

(51) Int. Cl.
*G10L 15/22* (2006.01)
*H04N 21/422* (2011.01)
(Continued)

(52) U.S. Cl.
CPC ....... *H04N 21/42203* (2013.01); *G06F 3/167* (2013.01); *H04N 21/4415* (2013.01); *H04N 21/4852* (2013.01)

(58) Field of Classification Search
CPC ..... G10L 15/22; H04N 21/472; H04N 21/485
See application file for complete search history.

(56) References Cited

U.S. PATENT DOCUMENTS

| | | | |
|---|---|---|---|
| 7,769,589 B2 * | 8/2010 | Lee .......................... | G10L 13/00 704/258 |
| 9,747,384 B1 * | 8/2017 | Rao .......................... | G06F 16/95 |

(Continued)

FOREIGN PATENT DOCUMENTS

| | | |
|---|---|---|
| CN | 105813227 A | 7/2016 |
| EP | 2869587 A1 | 5/2015 |

(Continued)

OTHER PUBLICATIONS

International Search Report (PCT/ISA/210) dated Oct. 16, 2017 issued by the International Searching Authority in International Application No. PCT/KR2017/006819.

(Continued)

*Primary Examiner* — Daniel Abebe
(74) *Attorney, Agent, or Firm* — Sughrue Mion, PLLC

(57) ABSTRACT

Provided are a display device and a screen display method for of the display device. In detail, disclosed are a display device capable of controlling a screen thereof through voice recognition, and a screen display method of the display device. Some of the disclosed embodiments provide a display device for displaying, on the screen, a recommendation guide corresponding to the voice recognition result, and a screen display method of the display device.

20 Claims, 7 Drawing Sheets

(51) Int. Cl.
  *G06F 3/16* (2006.01)
  *H04N 21/4415* (2011.01)
  *H04N 21/485* (2011.01)

(56) References Cited

U.S. PATENT DOCUMENTS

| | | | |
|---|---|---|---|
| 2012/0117600 A1 | 5/2012 | Friedlander et al. | |
| 2012/0162540 A1 | 6/2012 | Ouchi et al. | |
| 2014/0089824 A1* | 3/2014 | George | G06F 9/4451 715/762 |
| 2014/0195244 A1* | 7/2014 | Cha | H04N 21/233 704/270.1 |
| 2016/0005150 A1 | 1/2016 | Ghassabian | |
| 2016/0205427 A1* | 7/2016 | Yoon | G06F 3/0482 725/34 |
| 2018/0308477 A1* | 10/2018 | Nagasaka | G06F 3/167 |
| 2018/0364977 A1* | 12/2018 | Reichardt | H04N 7/163 |
| 2019/0129727 A1* | 5/2019 | Bovet | G06F 9/54 |

FOREIGN PATENT DOCUMENTS

| | | |
|---|---|---|
| EP | 3013039 A1 | 4/2016 |
| JP | 2008-268450 A | 11/2008 |
| JP | 4978927 B2 | 7/2012 |
| KR | 10-0672518 B1 | 1/2007 |
| KR | 10-1048321 B1 | 7/2011 |
| KR | 10-2012-0031548 A | 4/2012 |
| KR | 10-2012-0116324 A | 10/2012 |
| KR | 10-2013-0134545 A | 12/2013 |
| KR | 10-2014-0129547 A | 11/2014 |
| KR | 10-2015-0018663 A | 2/2015 |
| KR | 10-2015-0028191 A | 3/2015 |
| WO | 2015/034295 A1 | 3/2015 |

OTHER PUBLICATIONS

Written Opinion (PCT/ISA/237) dated Oct. 16, 2017 issued by the International Searching Authority in International Application No. PCT/KR2017/006819.
Communication dated Apr. 8, 2019, issued by the European Patent Office in counterpart European Application No. 17846820.3.
Communication dated Sep. 18, 2020 issued by the European Patent Office in European Application No. 17846820.3.

* cited by examiner

| | USER VOICE PATTERN | CHANNEL | DATE | TIME | CONTENT TYPE | SCREEN BRIGHTNESS | VOLUME |
|---|---|---|---|---|---|---|---|
| 421 | A | 100 | 2016.5.23 | 10:00~11:00 | SPORTS | 70 | 12 |
| 423 | B | CATV 21 | 2016.5.29 | 13:00~14:00 | MUSIC | 55 | 15 |
| 425 | C | VOD 32 | 2016.5.29 | 17:00~19:00 | MOVIE | 90 | 17 |
| 427 | A | 231 | 2016.5.23 | 10:00~11:00 | MUSIC | 50 | 10 |
| 429 | B | CATV 17 | 2016.5.29 | 13:00~14:00 | MOVIE | 45 | 15 |
| 431 | C | VOD 9 | 2016.5.29 | 17:00~19:00 | SPORTS | 60 | 13 |

401  403  405  407  409  411  413

500

DISPLAY DEVICE AND METHOD FOR CONTROLLING DISPLAY DEVICE

TECHNICAL FIELD

The following exemplary embodiments relate to a display device capable of controlling several functions at the same time in accordance with a situation of a user and a use pattern of the display device, and a method for controlling the display device.

BACKGROUND ART

Recently, a display device equipped with a voice recognition function has been rapidly increased. A user may switch the display device to a voice recognition mode to operate the display device by voice. Therefore, in recent years, the display device often has a user interface for switching to the voice recognition mode on the device itself or on a separate control device such as a remote controller for controlling the display device.

In recent years, the user may also easily execute the voice recognition mode of the display device by uttering a predetermined word. The predetermined word for executing the voice recognition mode is referred to as a trigger word. The trigger word may be set in the display device, but it may be set directly as a user-friendly word depending on the setting of the user. In addition, the trigger word may be inferred statistically by a voice recognition server and may be determined without additional user input. In addition, the voice recognition function not only provides a function of controlling the display device by voice, but also recognizes a user (hereinafter, referred to as a speaker) who utters a voice and provides a menu set by each user, a program favorite by each user, and the like. Specifically, the display device may recognize the user who utters the voice using a voice print, which is a graph obtained as a result of a time-series decomposition of a frequency distribution of the voice.

Meanwhile, as the functions of the display device become complicated (for example, various application execution, game execution, and the like) and become diverse, a need has arisen for a method by which the user may effectively control the display device by voice.

DISCLOSURE

Technical Problem

The following exemplary embodiments provide a display device capable of controlling several functions at the same time in accordance with a situation of a user and a use pattern of the display device, and a method for controlling the display device.

Technical Solution

According to an aspect of the present disclosure, a display device includes: a storage configured to store log data related to an operation of the display device; a display configured to display contents; a communicator configured to perform communication with an external device; a voice receiver configured to receive a voice signal; and a controller configured to control the storage, the display, the communicator, and the voice receiver, wherein the controller analyzes the log data to classify the log data for each of the users, generates a pattern from the log data classified for each of the users to store the pattern as a macro for each of the users, recognizes voice received through the voice receiver to determine a speaker, and executes a macro corresponding to the determined speaker.

According to another aspect of the present disclosure, a method for controlling a display device includes: storing log data related to an operation of the display device; analyzing the log data to classify the log data for each of the users; generating a pattern from the log data classified for each of the users to store the pattern as a macro; recognizing voice received through a voice receiver to determine a speaker; and executing a macro corresponding to the determined speaker.

Advantageous Effects

The display device according to an exemplary embodiment of the present disclosure may integrally control the plurality of functions of the display device by storing the log data related to the operation of the display device, analyzing the stored log data to classify the log data for each of the users, generating a pattern from the log data classified for each of the users to store the pattern as a macro for each of the users, and identifying a user who utters a voice to execute the macro corresponding to the user. Therefore, the user may conveniently manipulate the display device.

DESCRIPTION OF DRAWINGS

FIG. 4 illustrates an example of log data stored in a storage.

BEST MODE

Figure 1:
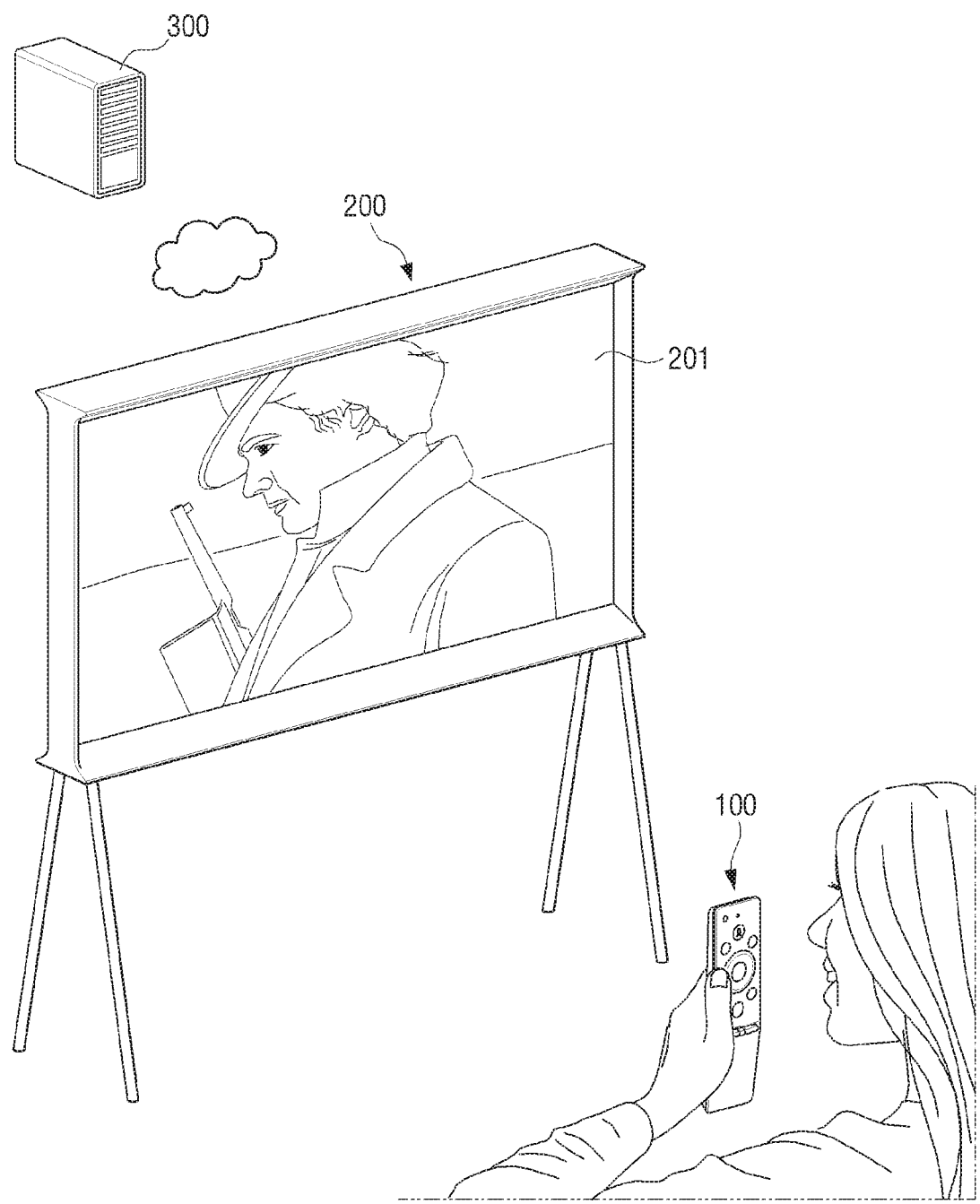
FIG. 1 is a schematic view illustrating an operation between a display device, a remote controller, and a server according to an exemplary embodiment of the present disclosure.

Hereinafter, exemplary embodiments of the present disclosure will be described in detail with reference to the contents mentioned in the accompanying drawings. In addition, a method for manufacturing and using a display device according to an exemplary embodiment of the present disclosure will be described in detail with reference to the contents mentioned in the accompanying drawings. Throughout the accompanying drawings, like reference numerals denote parts or components performing substantially the same function.

Terms including ordinal numbers such as "first", "second", and the like, may be used to describe various components. However, these components are not limited by these terms. The terms are used only to distinguish one component from another component. For example, a first component may be named a second component and the second component may also be similarly named the first component, without departing from the scope of the present disclosure. A term "and/or" includes a combination of a plurality of related items or any one of the plurality of related items.

In an exemplary embodiment of the present disclosure, the term "selection of button (or a key)" present in a remote controller 200 (see FIG. 1) may be used as the term that means a press of a button (or key) or a touch of a button (or key). In addition, the term "user input" may be used as the term including, for example, a button (or key) selection of a user, a press of a button (or key) of a user, a button touch of a user, a touch gesture of a user, a voice of a user, or a motion of a user.

In an exemplary embodiment of the present disclosure, the term "a screen of a display device" may be used as a meaning including a display of the display device.

Terms used in the present specification are used to describe exemplary embodiments, and are not intended to restrict and/or limit the present disclosure. Singular forms are intended to include plural forms unless the context clearly indicates otherwise. It should be understood that terms "comprise" or "have" used in the present specification, specify the presence of features, numerals, steps, operations, components, parts mentioned in the present specification, or combinations thereof, but do not preclude the presence or addition of one or more other features, numerals, steps, operations, components, parts, or combinations thereto.

Throughout the accompanying drawings, like reference numerals denote members performing substantially the same function.

FIG. 1 is a schematic view illustrating an operation between a display device, a remote controller, and a server according to an exemplary embodiment of the present disclosure.

Referring to FIG. 1, a display device 200, a remote controller 100, and one or a plurality of servers 300 are displayed.

Figure 2:
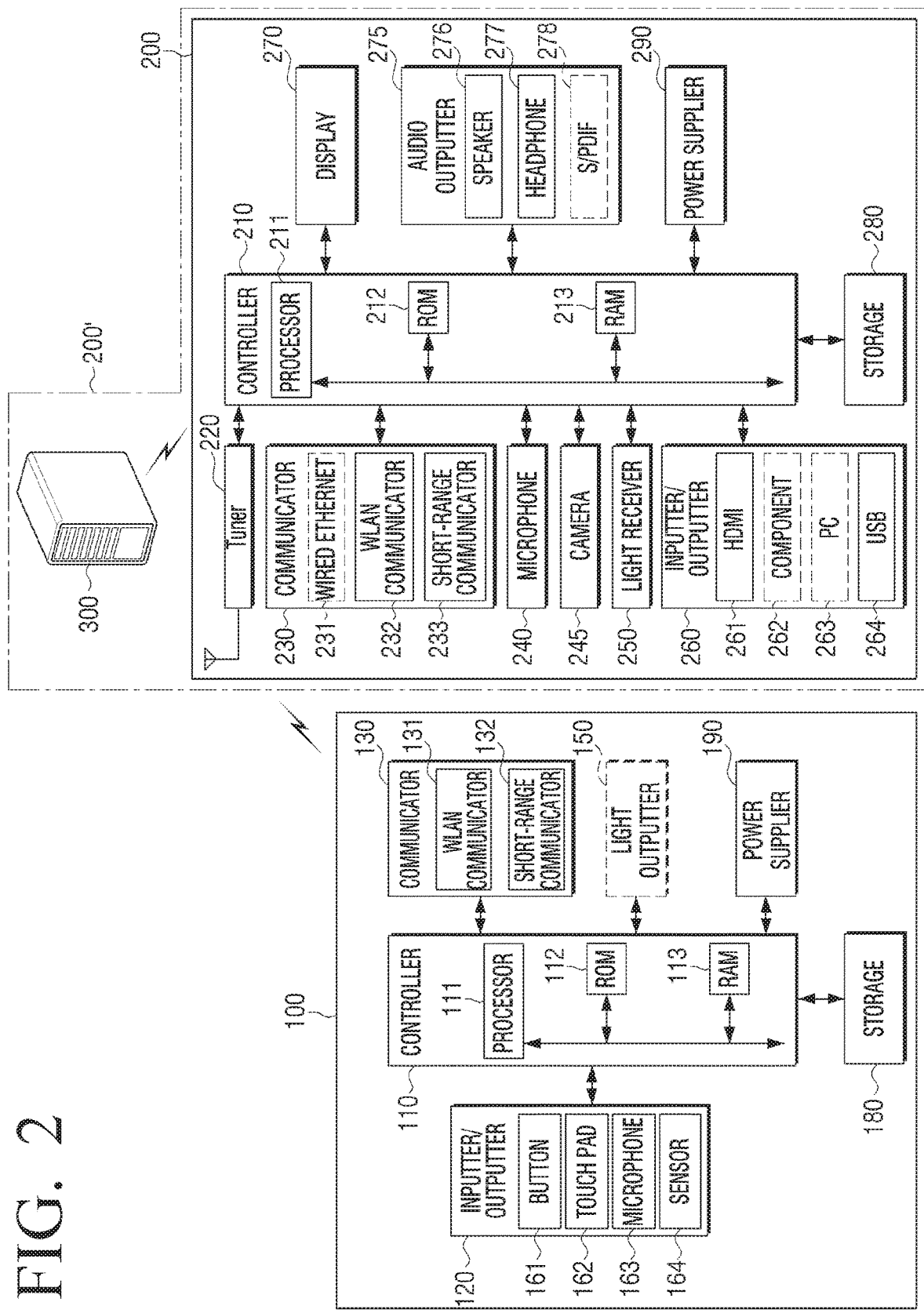
FIG. 2 is a block diagram illustrating the display device, the remote controller, and the server according to an exemplary embodiment of the present disclosure.

The display device 200 capable of outputting not only a received broadcast but also the content may receive a voice of a user using an embedded or connectable microphone 240 (see FIG. 2). In addition, the remote controller 100 may receive the voice of the user using a microphone 163 (see FIG. 2).

The remote controller 100 may control the display device 200 by outputting (or transmitting) a control command via infrared or near field communication (e.g., Bluetooth, etc.). In addition, the remote controller 100 may convert the voice received via infrared or near field communication (e.g., Bluetooth, etc.) and transmit the converted voice to the display device 200.

The user may control (e.g., power on/off, booting, channel change, volume adjustment, content playback, etc.) the display device 200 by using a selection of a key (including a button) on remote control 100 and an input of a user (e.g., a touch (gesture) through a touchpad), voice recognition through a microphone 163, or motion recognition through a sensor 164 (see FIG. 2)).

The user may control the display device 200 using voice. The microphone 163 of the remote controller 100 may receive voice of the user corresponding to the control of the display device 200. The remote controller 100 may convert the received voice into an electrical signal (e.g., digital signal, digital data, or packet) and transmit the converted electrical signal to the display device 200.

The user may also control (e.g., power on/off, booting, channel change, volume adjustment, content playback, etc.) the display device 200 by motion recognition through a camera 245 (see FIG. 2) attached to the display device. In addition, the user may control a screen of the display device 200 by using a motion of the remote controller 100 (e.g., gripping or moving the remote controller 100).

Referring to FIG. 1, the voice recognition server 300 may convert an electrical signal (or a packet corresponding to the electrical signal) corresponding to the user voice input from the remote controller 100 or the display device 200 into voice data (e.g., text, code, etc.) generated through the voice recognition.

An interactive server (not illustrated) may convert the converted voice data into control information (e.g., control command controlling the display device 200) recognizable in the display device 200. The converted control information may be transmitted to the display device 200.

A detailed description of the voice recognition server 300 will be described below.

FIG. 2 is a block diagram illustrating the display device, the remote controller, and the server according to an exemplary embodiment of the present disclosure.

Referring to FIG. 2, the display device 200 that receives the electrical signal corresponding to the user voice from the remote controller 100 may be connected to an external device (e.g., the server 300) by using a communicator 230 or an inputter/outputter 260 in a wired or wireless manner.

The display device 200 that receives the electrical signal corresponding to the user voice from the remote controller 100 may transmit the received electrical signal (or the packet corresponding to the electrical signal) to the external device (e.g., the server 300) connected thereto in the wired or wireless manner by using the communicator 230 or the inputter/outputter 260. In addition, the display device 200 may transmit the electrical signal (or the packet corresponding to the electrical signal) corresponding to the user voice received through the microphone 240 to the external device (e.g., the server 300) connected thereto in the wired or wireless manner by using the communicator 230 or the inputter/outputter 260. The external device may include a cellular phone (not illustrated), a smartphone (not illustrated), a tablet personal computer (PC) (not illustrated), and a PC (not illustrated).

The display device 200 may include a display 270, and further include one of a tuner 220, the communicator 230, and the inputter/outputter 260. The display device 200 may include the display 270, and further include a combination of the tuner 220, the communicator 230, and the inputter/outputter 260. In addition, the display device 200 having the display 270 may be electrically connected to a separate display device (not illustrated) having a tuner (not illustrated).

The display device 200 may be implemented as, for example, an analog television (TV), a digital TV, a three dimensional (3D) TV, a smart TV, a light emitting diode (LED) TV, an organic light emitting diode (OLED) TV, a plasma TV, a monitor, a curved TV having a screen having a fixed curvature, a flexible TV having a screen having a fixed curvature, a bended TV having a screen having a fixed curvature, and/or a curvature variable TV in which a current curvature of a screen may be varied by a received user input, but those skilled in the art easily understands that the display device 200 is not limited thereto.

The display device 200 includes the tuner 220, the communicator 230, the microphone 240, the camera 245, a light receiver 250, the inputter/outputter 260, the display 270, an audio outputter 275, a storage 280, and a power supplier 290. The display device 200 may include a sensor (for example, an illumination sensor, a temperature sensor, or the like (not illustrated)) that detects an internal or external state of the display device 200.

The controller 210 may include a processor 211, a read only memory (ROM) (or a non-volatile memory) 212 in which a control program for controlling the display device 200 is stored, and a random access memory (RAM) (or a volatile memory) 213 storing signals or data input from the outside of the display device 200 therein or used as a storing region corresponding to various processes performed in the display device 200.

The controller 210 serves to control an overall operation of the display device 200 and signal flows between internal components 210 to 290 of the display device 200, and to process data. The controller 210 controls power supplied from the power supplier 290 to the internal components 210 to 290. In addition, in the case in which a user input is present or a preset and stored condition is satisfied, the controller 210 may execute an operating system (OS) stored in the storage 280 or various applications.

The processor 211 may include a graphic processor (not illustrated) for processing a graphic corresponding to an image or a video. The processor 211 may include the graphic processor (not illustrated) or may be separately implemented. The processor 211 may be implemented as a system on chip (SoC) including a core (not illustrated) and a graphic processor (not illustrated). In addition, the processor 211 may be implemented as a SoC including at least one of the ROM 212 and the RAM 213. The processor 211 may include a single core, a dual core, a triple core, a quad core, or a multiple-number core thereof.

The processor 211 of the display device 200 may include a plurality of processors. The plurality of processors may include a main processor (not illustrated) and a sub processor (not illustrated) that operates in a screen-off (or power-off) and/or standby mode, which is one of the states of the display device 200. In addition, the plurality of processors may further include a sensor processor (not illustrated) that controls a sensor (not illustrated).

The processor 211, the ROM 212, and the RAM 213 may be connected to one another via an internal bus.

The controller 210 controls the display displaying the contents and the communicator connected to the remote controller and the voice recognition server, transmits a signal corresponding to a user voice received from the remote controller through the communicator to the voice recognition server, and performs a control so that a recommendation guide is displayed on the display in response to a voice recognition result received from the voice recognition server.

The controller 210 may perform a control so that other user interfaces are displayed on the display in response to the reception of the signal corresponding to the user voice, the transmission of the received signal to the voice recognition server, and the reception of the voice recognition result.

The controller 210 may perform a control so that the signal corresponding to the received user voice is transmitted to the voice recognition server through the communicator.

The controller 210 may analyze the log data stored in the storage to classify the log data for each of the users, generate a pattern from the log data classified for each of the users to store the pattern as a macro for each of the users, recognize the voice received through the voice receiver to determine a speaker, and execute a macro corresponding to the determined speaker.

The controller 210 may perform a control so that guide information for a macro being executed is displayed on the display.

In the exemplary embodiment of the present disclosure, the term "the controller of the display device 200" may be understood to include the processor 211, the ROM 212, and the RAM 213 of the display device 200. In the exemplary embodiment of the present disclosure, the term "the controller of the display device 200" may refer to the processor 211 of the display device 200. In the exemplary embodiment of the present disclosure, the term "the controller of the display device 200" may be understood to include the main processor, the sub processor, the ROM 212, and the RAM 213 of the display device 200.

It will be easily understood by those skilled in the art that a configuration and an operation of the controller 210 may be variously implemented according to exemplary embodiments.

The tuner 220 may tune and select only a frequency of a channel that is intended to be received by the display device 200 among many radio wave components through amplification, mixing, resonance, or the like, of broadcasting signals received in a wired or wireless manner. The broadcasting signals include video, audio, and additional data (for example, an electronic program guide (EPG)).

The tuner 220 may receive the video, the audio, and the data in a frequency band corresponding to a channel number (e.g., cable broadcasting channel No. 506) corresponding to the user input (e.g., voice, motion, button input, touch input, etc.).

The tuner 220 may receive the broadcasting signals from various sources such as terrestrial broadcasting, cable broadcasting, satellite broadcasting, Internet broadcasting, and the like.

The tuner 220 may be implemented in all-in-one with the display device 200, or may be implemented as a tuner (not illustrated) electrically connected to the display device 200, or a separate display device (e.g., a set-top box, or one connect (not illustrated)) having a tuner (not illustrated).

The communicator 230 may connect the display device 200 to the remote controller 200, or the external device 300 by the control of the controller 210. The communicator 230 may transmit an electrical signal (or a packet corresponding to the electrical signal) corresponding to the user voice to the first server 300 or receive voice data corresponding to the electrical signal (or the packet corresponding to the electrical signal) from the first server 300 by the control of the controller 210. In addition, the communicator 230 may transmit the voice data received by the control of the controller 210 to the second server, or receive control information corresponding to the voice data from the second server.

The communicator 230 may serve as the voice receiver, and may receive a voice signal from the external device.

The communicator 230 may download an application from the outside or perform web browsing by the control of the controller 210.

The communicator 230 may include one of a wired Ethernet 231, a wireless local area network (WLAN) communicator 232, and a short-range communicator 233 depending on a performance and structure of the display device 200. In addition, the communicator 230 may include a combination of the Ethernet 232, the WLAN communicator 232, and the short-range communicator 233.

The WLAN communicator 232 may be wirelessly connected to an application processor (AP) at a place at which the AP is installed by a control of the controller 210. The WLAN communicator 232 may include, for example, Wi-Fi. The WLAN communicator 232 may support WLAN standard (IEEE802.11x) of Institute of electrical and electronics engineers (IEEE). The short-range communicator 233 may perform short-range communication between the remote controller 100 and the external device wirelessly without the AP by the control of the control unit 210. The short-range communication may include, for example, Bluetooth, Bluetooth low energy, infrared data association (IrDA), ultra-wideband (UWB), near field communication (NFC), or the like.

The communicator 230 according to an exemplary embodiment of the present disclosure may receive a control signal transmitted from the remote controller 100. In addition, the short-range communicator 233 may receive the control signal transmitted from the remote controller 200 by the control of the controller 210.

The microphone 240 may receive uttered voice of the user. The microphone 240 may convert the received voice into an electrical signal and output the electrical signal to the controller 210. The user voice may be, for example, voice corresponding to a control of user guides, menus, or functions of the display device 200. A recognition range of the microphone 240 may vary depending on magnitude of voice of the user and the surrounding environments (e.g., speaker sound and ambient noise). That is, the microphone 240 may receive the voice signal and serve as the voice receiver.

The microphone 240 may be implemented integrally with the display device 200 or be separated from the display device 200. The microphone 240 separated from the display device 200 may be electrically connected to the display device 200 through the communicator 230 or the input/outputter 260.

The camera 245 captures a video (e.g., continuous frames) corresponding to a motion of the user in the recognition range of the camera. The motion of the user may include, for example, presence (for example, appearance of the user in the recognition range of camera) of the user, a portion of a body of the user such as a face, a facial expression, a hand, a fist, or a finger of the user, a motion of a portion of the body of the user, or the like. The camera 245 may include a lens (not illustrated) and an image sensor (not illustrated).

The camera 245 may be positioned at one of an upper end, a lower end, a left side, and a right side of the display device 200.

The camera 245 may convert the captured continuous frames by the control of the controller 210 and output the converted continuous frames to the controller 210. The controller 210 may analyze the captured continuous frames to recognize the motion of the user. The controller 210 may display guides and display menus on the display device 200, or perform a control (for example, channel adjustment, volume adjustment, or the like) corresponding to the motion recognition result by using a motion recognition result.

In a case in which the number of the cameras 245 is plural, a plurality of cameras 245 may receive a three-dimensional still image or a three-dimensional motion (video or image).

The camera 245 may be implemented integrally with the display device 200 or be separated from the display device 200. A display device (not illustrated) including the camera (not illustrated) separated from the display device may be electrically connected to the display device 200 through the communicator 230 or the inputter/outputter 260.

The light receiver 250 receives an optical signal (including the control signal) output from the remote controller 200 through an optical window (not illustrated).

The light receiver 250 may receive an optical signal corresponding to the user input (e.g., touch, press, touch gesture, voice, or motion) from the remote controller 200. The control signal may be extracted from the received optical signal. The received optical signal and/or the extracted control signal may be transmitted to the controller 210.

The inputter/outputter 260 receives the contents from the outside of the display device 200 by the control of the controller 210. The contents may include, for example, a video, an image, a text, or a web document.

The inputter/outputter 260 may include one of a high-definition multimedia interface (HDMI) input port 261, a component input jack 262, a PC input port 263, and a universal serial bus (USB) input jack 264 corresponding to the reception of the content. The inputter/outputter 260 may include a combination of the HDMI input port 262, the component input jack 262, the PC input port 263, and the USB input jack 264. It will be easily understood by those skilled in the art that other components may be added to the components of the inputter/outputter 260 described above or some of the components of the inputter/outputter 260 described above may be deleted and/or changed, depending on a performance and a structure of the display device 200.

The display 270 displays the video included in the broadcasting signal received through the tuner 220 by the control of the controller 210. The display 270 may display the contents (for example, the video) input through the communicator 230 or the inputter/outputter 260. The display 270 may output the contents stored in the storage 280 by the control of the controller 210. In addition, the display 270 may display a user interface (UI) for performing a voice recognition task corresponding to the voice recognition or a user interface for performing a motion recognition task corresponding to the motion recognition. For example, the user interface may include a voice instructions guide (e.g., recommendation voice data or recommendation guide) and a motion instructions guide.

The screen of the display device 200 according to an exemplary embodiment of the present disclosure may be used to include the display 270 of the display device 200.

The display 270 according to an exemplary embodiment of the present disclosure may display a visual feedback corresponding to the display of the recommendation guide by the control of the controller 210.

A display 270 according to another exemplary embodiment of the present disclosure may be separated from the display device 200. The display 270 may be electrically connected to the display device 200 through the inputter/outputter 260 of the display device 200.

The audio outputter 275 outputs the audio included in the broadcasting signal received through the tuner 220 by the control of the controller 110. The audio outputter 275 may output an audio (corresponding to, for example, a voice or sound) input through the communicator 230 or the inputter/outputter 260. In addition, the audio outputter 275 may output an audio file stored in the storage 280 by the control of the controller 110.

In addition, the audio outputter 275 may output guide information on the macro being executed by the control of the controller.

The audio outputter 275 may include one of a speaker 276, a headphone output terminal 277, or an S/PDIF output terminal 278. In addition, the audio outputter 275 may include a combination of the speaker 276, the headphone output terminal 277, and the S/PDIF output terminal 278.

The audio outputter 275 according to an exemplary embodiment of the present disclosure may output an aural feedback corresponding to the recommendation guide by the control of the controller 210 of the display device 200.

The storage 280 may store various data, programs, or applications for driving and controlling the display device 200 by the control of the controller 210. The storage 280 may store input/output signals or data corresponding to driving of the tuner 220, the communicator 230, the microphone 240, the camera 245, the light receiver 250, the inputter/outputter 260, the display 270, the audio outputter 275, and the power supplier 290.

The storage 280 may store a control program for a control of the display device 200 and the controller 210, an application initially provided from a manufacturer or downloaded from the outside, a graphical user interface (hereinafter, referred to as a 'GUI') related to the application, an object (for example, an image text, an icon, a button, or the like) for providing the GUI, user information, a document, a voice database, a motion database, or related data.

The storage 280 may include a broadcasting receiving module, a channel control module, a volume control module, a communication control module, a voice recognizing module, a motion recognizing module, a light receiving module, a display control module, an audio control module, an external input control module, a power control module, a voice database (DB), or a motion database (DB) that are not illustrated.

The modules and the databases (not illustrated) included in the storage 280 may be implemented in the form of software to perform a control function of a broadcasting reception, a channel control function, a volume control function, a communication control function, a voice recognizing function, a motion recognizing function, a light receiving control function, a display control function, an audio control function, an external input control function, or a power control function in the display device 200. The controller 210 may perform an operation and/or a function of the display device 200 using the software stored in the storage 280.

The storage 280 may store the voice data received from the voice recognition server 300. The storage 280 may store the control information received from the voice recognition server 300. The storage 280 may store the control information received from an interactive server (not illustrated).

The storage 280 may store a database corresponding to a phoneme corresponding to the user voice. In addition, the storage 280 may store a control information database corresponding to the voice data.

The storage 280 may store a moving image, an image, or a text corresponding to the visual feedback.

The storage 280 may store sound corresponding to the aural feedback.

The storage 280 may store a feedback providing time (e.g., 300 ms) of the feedback provided to the user.

The storage 280 may store the log data.

In an exemplary embodiment of the present disclosure, the term 'storage' may be used as the term including the storage 280, the ROM 212 and the RAM 213 of the controller 210, a storage (not illustrated) implemented by an SoC (not illustrated), a memory card (for example, a micro SD card, a USB memory) (not illustrated) mounted in the display device 200, or an external storage (for example, a USB memory, or the like) (not illustrated) that may be connected to the USB port 264 of the inputter/outputter 260. In addition, the storage may include a non-volatile memory, a volatile memory, a hard disk drive (HDD), or a solid state drive (SDD).

The power supplier 290 supplies power input from an external power source to the internal components 210 to 290 of the display device 200 by the control of the controller 210. The power supplier 290 may supply power input from one or two or more batteries (not illustrated) positioned in the display device 200 to the internal components 210 to 290 by the control of the controller 210.

The power supplier 290 may include a battery (not illustrated) supplying power to the camera 245 of the display device 200 that is in a power-off state (however, a state in which a power plug is connected to a power receptacle).

At least one component may be added to, changed for, or deleted (e.g., at least one of boxes illustrated in dashed lines) from the components (e.g., 210 to 290) illustrated in the display device 200 of FIGS. 1 and 2 in response to the performance and/or type of the display device 200. In addition, it will be easily understood by those skilled in the art that positions of the components (e.g., 210 to 290) may be changed depending on the performance or structure of the display device 200.

Hereinafter, an example of a case of controlling the screen of the display device will be described in detail.

Referring to FIG. 2, the remote controller 100 that remotely controls the display device 200 includes the controller 110, the communicator 130, the inputter 160, the light outputter 150, the display 170, the storage 180, and the power supplier 190. The remote controller 100 may include one of the communicator 130 and the light outputter 150. In addition, the remote controller 100 may include both the communicator 130 and the light outputter 150.

The remote controller 100 may be used as the term referring to the display device that may remotely control the display device 200. In addition, the remote controller 100 may include the display device in which an application (not illustrated) for control of the display device 200 may be installed (or may be downloaded from the outside).

The display device in which the application (not illustrated) for control of the display device 200 is installed may have a display (e.g., having only a display panel without a touch screen or a touch panel). For example, the display device having the display may include a cellular phone (not illustrated), a smartphone (not illustrated), a tablet PC (not illustrated), a laptop PC (not illustrated), another display device (not illustrated), or home appliances (for example, a refrigerator, a washing machine, a cleaner, and the like).

The user may control the display device 200 by using a function button (for example, a channel change button) (not illustrated) in a graphical user interface (GUI) (not illustrated) provided from the executed application.

The controller 110 may include a processor 111, a read only memory (ROM) (or a non-volatile memory) 112 in which a control program for controlling the remote controller 100 is stored, and a random access memory (RAM) (or a volatile memory) 113 storing signals or data input from the outside of the remote controller 100 or used as a storing region for various tasks performed in the remote controller 100.

The controller 110 controls an overall operation of the remote controller 100 and signal flows between internal components 110 to 190 of the remote controller 100, and serves to process data. The controller 110 controls supply of power to the internal components 110 to 190 using the power supplier 190.

The term "controller 110" in an exemplary embodiment of the present disclosure may include the processor 111, the ROM 112, and the RAM 113 of the remote controller 100.

The communicator 130 may transmit a control signal (e.g., a control signal corresponding to power-on, or a control signal corresponding to a volume adjustment) corresponding to a user input (e.g., touch, press, touch gesture, voice, or motion) to the display device 200 which is a control object by the control of the controller 110.

The communicator 130 may be wirelessly connected to the display device 200 by the control of the controller 110. The communicator 130 may include at least one of a WLAN communicator 131 and a short-range communicator 132 (e.g., one of the WLAN communicator 131 and the short-range communicator 132, or both the WLAN communicator 131 and the short-range communicator 132).

Since the communicator 130 of the remote controller 100 is substantially the same as the communicator 230 of the display device 200, an overlapped description is omitted.

The inputter/outputter 120 may include a button 161 or a touch pad 162 receiving a user input (e.g., touch or press) for controlling the display device 200. The inputter/outputter 120 may include a microphone 163 receiving an uttered user voice, a sensor 164 detecting a motion of the remote controller 100, or a vibration motor (not illustrated) providing a haptic feedback.

The inputter/outputter 120 may output an electrical signal (e.g., an analog signal or a digital signal) corresponding to the received user input (e.g., touch, press, touch gesture, voice, or motion) to the controller 110.

The touch pad 162 may receive a touch of the user or a touch gesture of the user. The touch pad 162 may be implemented as a direction key and an enter key. In addition, the touch pad 162 may also be positioned on a front surface of the remote controller 100.

The microphone 163 receives the uttered voice of the user. The microphone 163 may convert the received voice and output the converted voice to the controller 110. The controller 210 may generate a control signal (or an electrical signal) corresponding to the user voice and transmit the control signal to the display device 200 through the communicator 130.

The sensor 164 may detect an internal state and/or an external state of the remote controller 100. For example, the sensor 164 may include a motion sensor (not illustrated), a gyro sensor (not illustrated), an acceleration sensor (not illustrated), or a gravity sensor (not illustrated). The sensor 164 may measure motion acceleration or gravity acceleration of the remote controller 100, respectively.

The vibration motor (not illustrated) may convert the signal into mechanical vibrations according to the control of the controller 210. For example, the vibration motor (not illustrated) may include a linear vibration motor, a bar type vibration motor, a coin type vibration motor, or a piezoelectric element vibration motor. One or a plurality of vibration motors (not illustrated) may be positioned in the remote controller 200.

The light outputter 150 may output an optical signal corresponding to the user input (e.g., touch, press, touch gesture, voice, or motion) by the control of the controller 110. The output optical signal may be received by the light receiver 250 of the display device 200. As a remote controller code format used in the remote controller 100, one of a manufacturer dedicated remote controller code format and a commercial remote controller code format may be used. The remote controller code format may include a leader code and a data word. The output optical signal may be modulated into a carrier wave and be then output. The control signal may be stored in the storage 280 or may also be generated by the controller 110. The remote controller 100 may include an infrared-laser emitting diode (IR-LED).

The remote controller 100 may include one or both of the communicator 130 and the light outputter 150 that may transmit the control signal to the display device 200.

The controller 110 may output the control signal corresponding to the user voice to the display device 200 through at least one of the communicator 130 and the light outputter 150. The controller 110 may preferentially transmit the control signal corresponding to the user voice to the display device 200 through one of the communicator 130 and the light outputter 150 (e.g., the communicator 130).

The storage 180 may store various data, programs, or applications for driving and controlling the remote controller 100 by the control of the controller 110. The storage 180 may store input or output signals or data corresponding to driving of the communicator 130, the light outputter 150, and the power supplier 190.

The storage 180 may store control information corresponding to the received user input (e.g., touch, press, touch gesture, voice, or motion) and/or control information corresponding to a motion of the remote controller 100 by the control of the controller 110.

The storage 180 may store remote controller information corresponding to the remote controller 100. The remote controller information may include a model name, unique device identification (ID), a remaining amount of a memory, whether or not object data are present, a Bluetooth version, or a Bluetooth profile.

The power supplier 190 supplies power to the components 110 to 190 of the remote controller 100 by the control of the controller 110. The power supplier 190 may supply power from one or two or more batteries (not illustrated) positioned in the remote controller 100 to the components 110 to 190. The battery may be positioned inside a space between a surface of the remote controller 200 (e.g., on which the button 161 or the touch pad 162 are present) and a rear surface (not illustrated).

At least one component may be added to, changed for, or deleted (e.g., at least one of boxes illustrated in dashed lines) from the components illustrated in the remote controller 100 of FIGS. 1 and 2 in response to the performance of the remote controller 100. In addition, it will be easily understood by those skilled in the art that positions of the components may be changed depending on a performance or structure of the remote controller 100.

The voice recognition server 300 receives the packet corresponding to the user voice input from the remote controller 100 or the display device 200 through a communicator (not illustrated). A controller (not illustrated) of the voice recognition server 300 performs voice recognition by analyzing the received packet using a voice recognizer (not illustrated) and a voice recognition algorithm.

The controller (not illustrated) of the voice recognition server 300 may convert the received electrical signal (or the packet corresponding to the electrical signal) into voice recognition data including a text of the form of word or sentence using the voice recognition algorithm.

The controller (not illustrated) of the voice recognition server 300 may transmit the voice data to the display device 200 through the communicator (not illustrated).

The controller (not illustrated) of the voice recognition server 300 may convert the voice data into control information (e.g., control instructions). The control information may control an operation (or function) of the display device 200.

The voice recognition server 300 may include a control information database. The controller (not illustrated) of the voice recognition server 300 may determine control information corresponding to the converted voice data by using the stored control information database.

The voice recognition server 300 may also convert the converted voice data into the control information that controls the display device (e.g., that the controller 210 of the display device 200 parses) by using the control information database.

The controller (not illustrated) of the voice recognition server 300 may transmit the control information to the display device 200 through the communicator (not illustrated).

In an exemplary embodiment of the present disclosure, the voice recognition server 300 may be integrated with the display device 200 (200'). The voice recognition server 300 may be included 200' in the display device 200 as a separate component from the components 210 to 290 of the display device 200. The voice recognition server 300 may be embedded in the storage 280 of the display device 200 or may also be implemented in a separate storage (not illustrated).

In an exemplary embodiment of the present disclosure, an interactive server (not illustrated) may be implemented separately from the voice recognition server 300. The interactive server (not illustrated) may convert the voice data converted by the voice recognition server 300 into the control information. The interactive server (not illustrated) may convert the voice data received from one of the voice recognition server 300 and the display device 200 into the control information. The interactive server (not illustrated) may transmit the converted control information to the display device 200.

At least one component may be added to or deleted from the components illustrated in the voice recognition server 300 of FIGS. 1 and 2 in response to the performance of the voice recognition server 300.

Figure 3:
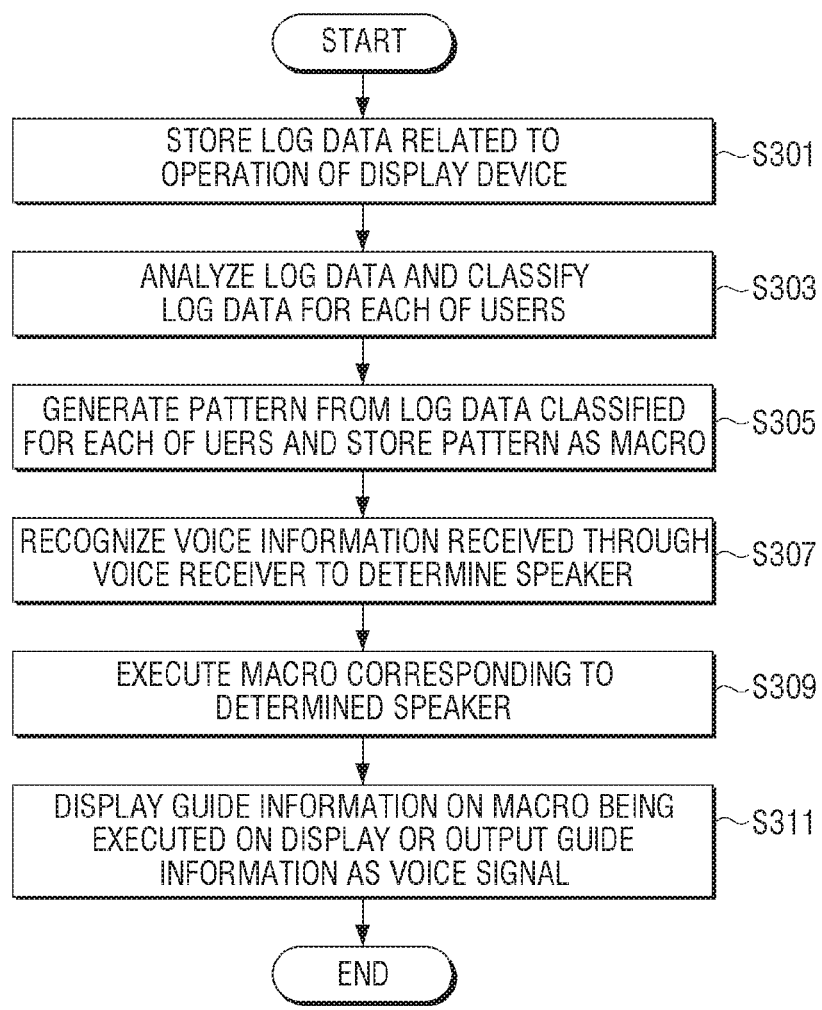
FIG. 3 is a schematic flow chart illustrating a method for controlling a display device according to an exemplary embodiment of the present disclosure.

FIG. 3 is a schematic flow chart illustrating a method for controlling a display device according to an exemplary embodiment of the present disclosure.

In step S301 of FIG. 3, the display device may store log data related to an operation of the display device. The log data may be stored in the storage. The log data may be data related to the operation of the display device. That is, the log data may be data generated while the display device is operated by a user or an event. For example, the log data may include an operation time of the display device, date, channel information, screen brightness, sound size, contents information being played back, and a voice pattern of the user operating the display device.

When the user operates the display device by a voice command, the voice patter of the user may be stored in the storage as the log data.

When the display device is powered-on, a current time and data may be stored in the storage as the log data.

When the user watches a TV, channel information and contents information currently being watched may be stored as the log data. In addition, screen brightness, volume information, and the like of the contents being watched by the user may be stored as the log data. In addition, the type of contents being watched by the user (e.g., sports, movies, drama, entertainment, etc.) may be stored as the log data.

Here, the contents may be received via air channel broadcasting, cable broadcasting, or Internet broadcasting.

In step S303, the display device analyzes the log data stored in the storage and classifies the log data for each of the users. The log data stored together with the voice pattern of the user may classify the log data for each of the users based on the voice pattern of the user.

FIG. 4 illustrates an example of log data stored in a storage.

Referring to FIG. 4, log data 400 may include information on user voice pattern 401, channel information 403, date 405, time 407, content type 408, screen brightness 411, and volume 413.

The log data 400 may be classified and stored based on the user voice pattern and keyword. Here, the keyword may be, for example, the content type 409. The keyword may be predetermined in the display device or the server or may be determined through a learning algorithm.

That is, the log data 400 may be classified and stored for each of the users based on the user voice pattern 401 and the keyword.

Referring back to FIG. 3, the display device may generate a pattern from the log data classified for each of the users in step S305 and store the pattern as a macro. Here, the pattern may be the content type 409. The display device may generate the pattern from the log data classified for each of the user voice patterns. For example, the display device may group the stored log data for each of the user voice patterns to classify the log data 400 for each of the users. Therefore, the log data 400 may be grouped into a group A (421, 427), a group B (423, 429), and a group C (425, 431).

Here, the group A (421, 427) is grouped into a user voice pattern of 'A'. The group B (423, 429) is grouped into a user voice pattern of 'B'. The group C (425, 431) is grouped into a user voice pattern of 'C'.

The display device again generates patterns in the group A (421, 427). Here, the patterns may be 'sports', 'music', and 'movies'. That is, the display device may analyze whether there is a predetermined keyword in the log data 400. The keyword may be set by the user or may be provided from the server. Alternatively, the display device may analyze the log data to search for 'sports', 'music', and 'movies' in a repeated pattern and may generate the searched 'sports', 'music', and 'movies' as the pattern.

The display device may again classify the log data grouped for each of the users for each of the patterns to generate macros 421, 423, 425, 427, 429, and 431. The display device may store the generated macros 421, 423, 425, 427, 429, and 431 in the storage. The display device may search for the macros 421, 423, 425, 427, 429, and 431 stored in the storage based on the user voice pattern 401.

In step S307, the display device may recognize voice information received through the voice receiver to determine a speaker. The voice information may include a voice signal or voice data. The voice receiver may be, for example, a circuit that converts voice input through the microphone embedded in a body of the display device into an electrical signal and converts the electrical signal into the voice data, or a circuit that a voice signal received from an external device such as a remote controller through the communicator into the voice data.

The display device may transmit the voice data to the voice recognition server 300 to perform voice recognition and determine the speaker who utters voice. In this case, the display device may packetize the voice data and transmit the packetized voice data to the voice recognition server 300.

A controller (not illustrated) of the voice recognition server 300 performs voice recognition for the received packet using a voice recognition algorithm. The voice recognition algorithm may divide the packet into sections having a predetermined length, and perform a sound analyzation for each section to extract parameters including a frequency spectrum and voice power. The voice recognition algorithm may divide the packet into units of phonemes and recognize the phonemes based on the parameters of units of the divided phonemes.

A storage (not illustrated) of the voice recognition server 300 may store (or update) a phoneme database corresponding to a specific phoneme. A controller (not illustrated) of the voice recognition server 300 may generate voice data using the recognized phoneme and the prestored database.

The controller (not illustrated) of the voice recognition server 300 may generate voice recognition data of the form of word or sentence. The voice recognition algorithm described above may include, for example, hidden markov model, or the like.

The controller (not illustrated) of the voice recognition server 300 may voice-recognize a waveform of the received packet to generate the voice data.

The controller (not illustrated) of the voice recognition server 300 may determine the user voice pattern using the voice data to determine the user (speaker) who utters the voice.

The controller (not illustrated) of the voice recognition server 300 may transmit information on the determined speaker to the display device, and the display device may search for the macros 421 to 431 stored in the storage 280 based on the information on the speaker transmitted from the voice recognition server 300.

According to an exemplary embodiment, the controller (not illustrated) of the voice recognition server 300 may extract the user voice pattern from the voice-recognized voice data, transmit the extracted voice pattern to the display device, and search for the macros stored in the storage 280 based on the voice pattern transmitted from the voice recognition server 300.

Meanwhile, the controller (not illustrated) of the voice recognition server 300 may store the recognized voice data in a storage (not illustrated). The controller (not illustrated) of the voice recognition server 300 may convert the recognized voice data into control information (e.g., control instructions). The control information may control an operation (or function) of the display device 200.

In addition, the controller (not illustrated) of the voice recognition server 300 may determine a trigger word that executes a macro function using the recognized voice data. The trigger word may be a predetermined word in the system. For example, the trigger word may be a predetermined word such as 'mode' uttered by the user. In addition, the trigger word may also be determined by the voice recognition server by inference through a statistical method even though there is no separate user input.

If the voice-recognized voice data is determined as the trigger word that executes the macro function, the controller (not illustrated) of the voice recognition server 300 may transmit information on the trigger word to the display device, and the display device may execute the macro corresponding to the speaker determined in step S309. The display device may receive the information on the trigger word transmitted by the controller (not illustrated) of the voice recognition server 300 to execute the corresponding macro.

For example, when a user A utters 'sports mode', the display device may execute the macro 421. The display device may set the screen brightness of the content being played back to '70' and the volume to '12'.

When a user B utters 'music mode', the display device may execute the macro 423. The display device may set the screen brightness of the content being played back to '55' and the volume to '15'.

When a user C utters 'movie mode', the display device may execute the macro 425. The display device may set the screen brightness of the content being played back to '90' and the volume to '17'.

When the user A utters 'music mode', the display device may execute the macro 423. The display device may set the screen brightness of the content being played back to '50' and the volume to '10'.

When the user B utters 'movie mode', the display device may execute the macro 429. The display device may set the screen brightness of the content being played back to '45' and the volume to '15'.

When the user C utters 'sports mode', the display device may execute the macro 431. The display device may set the screen brightness of the content being played back to '60' and the volume to '13'.

In step S311, the display device may display guide information on the macro being executed on the display. Specifically, the display device may display information on the brightness and volume of the content being currently played back on the screen while executing the macro.

Alternatively, in step S311, the display device may output the guide information on the macro being executed as voice. Specifically, the display device may output the information on the macro being currently executed as voice guidance while executing the macro.

Figure 5:
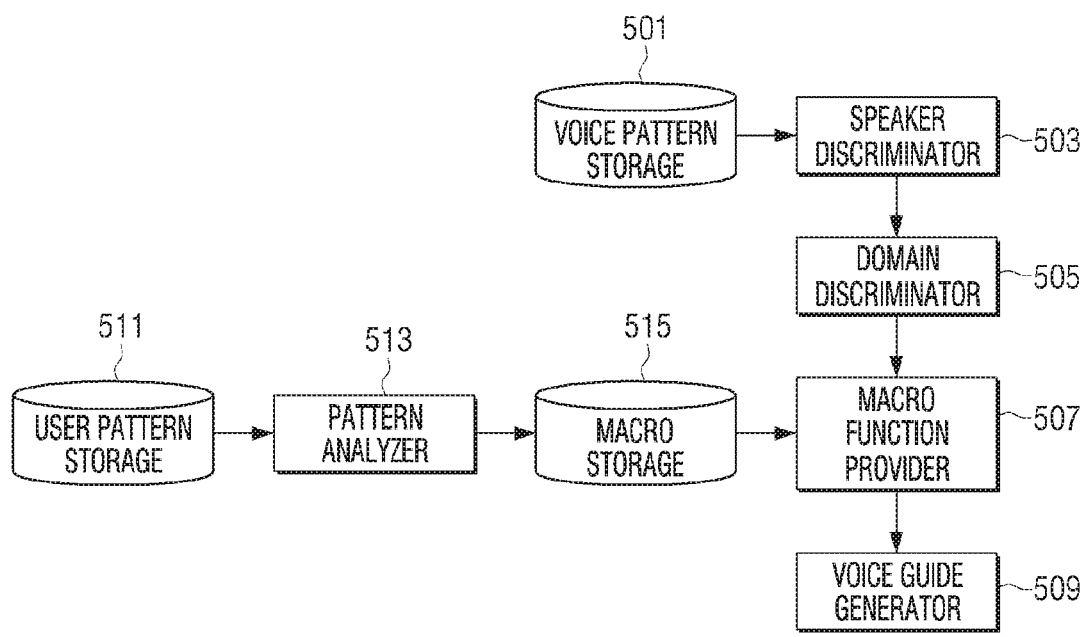
FIG. 5 illustrates a block diagram of a software module of processing a macro of the display device according to an exemplary embodiment of the present disclosure.

FIG. 5 illustrates a block diagram of a software module of processing a macro of the display device according to an exemplary embodiment of the present disclosure.

A macro processing block 500 may be stored in the storage in the form of instructions or the form of data constituting a program.

The macro processing block 500 may include a voice pattern storage 501, a speaker discriminator 503, a domain discriminator 506, a macro function provider 507, a voice guide generator 509, a user pattern storage 511, a pattern analyzer 513, and a macro storage 515.

The voice pattern storage 501 may store the voice pattern for each of the users and may be a space provided in the storage. When the user utters voice, the display device may store the voice pattern of the user in the storage. The display device may extract a feature point of the user from the voice data of the user and may store the extracted feature point as the voice pattern. The voice pattern may be stored in the storage as the database and may be easily found.

The speaker discriminator 503 may determine a speaker by comparing the voice data uttered by the user with the voice pattern stored in the voice pattern storage 501. For example, when the user A utters, the display device may extract the voice pattern from the uttered voice data of the user to compare the extracted voice pattern with the voice pattern stored in the voice pattern storage 501, and may determine the speaker from the found voice pattern when the same voice pattern is found. When the same voice pattern is not found, the display device may store the voice pattern of the user A in the voice pattern storage 501 as a new voice pattern.

The domain discriminator 505 may determine whether or not there is a word corresponding to a domain from the voice data uttered by the user. The domain may be a word capable of identifying a type of contents. For example, the domain may represent the type of contents such as 'sports', 'movie' 'music', and the like.

When the domain is determined, the display device may search for the macro storage 515 based on the word corresponding to the domain.

Meanwhile, when the user operates the display device by using the voice command, the display device may identify the user who utters the voice and may store the log data for the identified user in the user pattern storage 511. Since a detailed description thereof is the same as that described above with reference to FIGS. 3 and 4, the detailed description thereof is omitted.

The pattern analyzer 513 determines whether or not there is a word corresponding to the keyword or the domain in the log data stored in the user pattern storage 511. For example, the pattern analyzer 513 may search the log data of the user for the words such as 'movie', 'music', and/or 'sports' and may recognize the found word as the pattern.

The macro storage 515 may store setting values (e.g., screen brightness, volume information, etc.) stored in the log data and information that the user operates the display device as the macros according to a result analyzed by the pattern analyzer 513.

The macro function provider 507 searches the macro storage 515 for the corresponding macro using domain information, and executes a macro function.

When the macro is executed, the voice guide generator 509 generates voice guidance information on the corresponding macro and outputs the voice guidance information as a voice signal.

Figure 6:
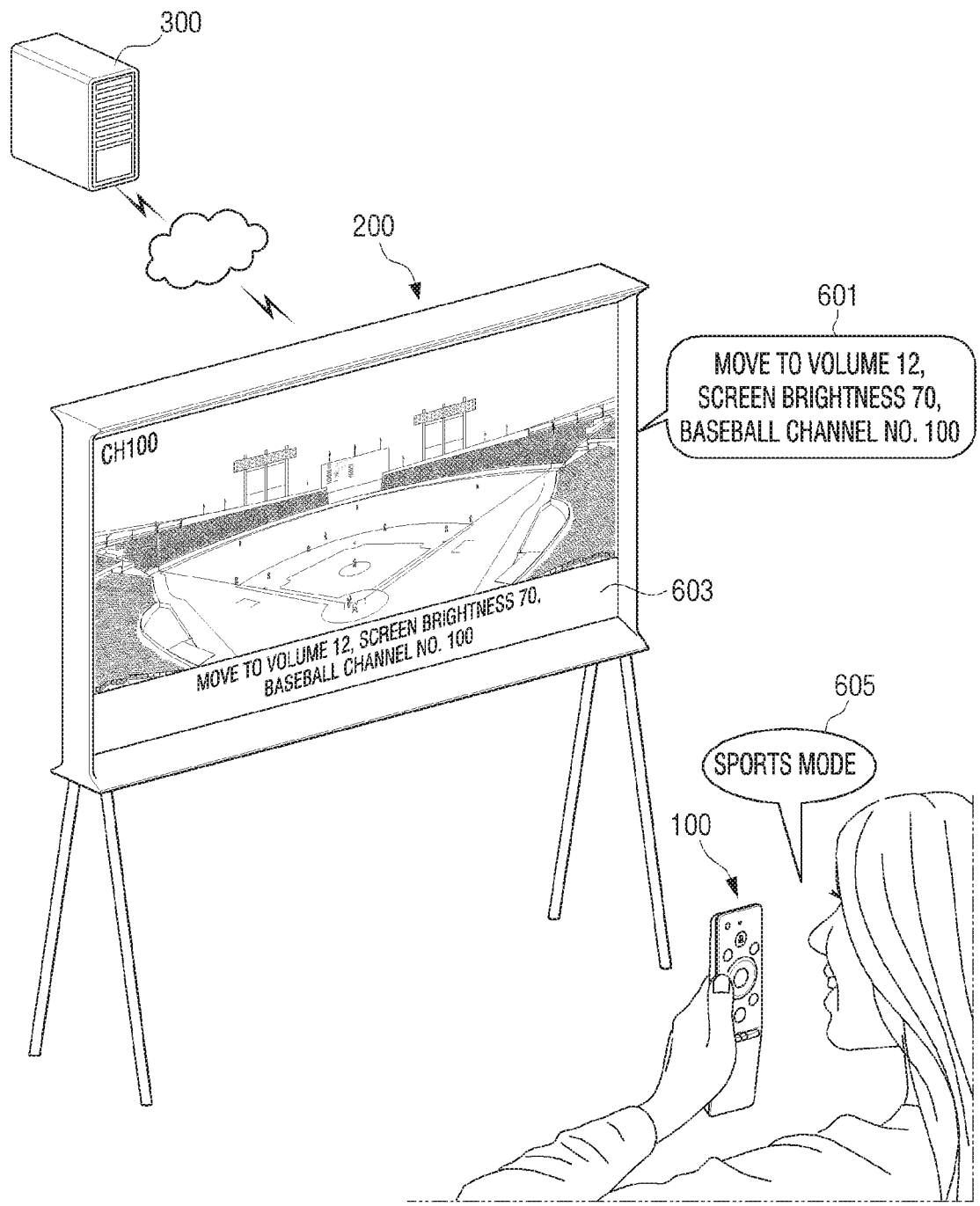
FIG. 6 illustrates an example in which the display device according to an exemplary embodiment of the present disclosure executes a macro function in accordance with voice uttering of a user.

FIG. 6 illustrates an example in which the display device according to an exemplary embodiment of the present disclosure executes a macro function in accordance with voice uttering of a user.

Referring to FIG. 6, an example is illustrated in which a user utters (605) a voice to operate the display device 200 in a sports mode.

When the user utters (605) the voice through the microphone embedded in the remote controller 100, the display device 200 may receive the voice signal of the user through the communicator.

That is, the microphone embedded in the remote controller 100 converts the voice of the user into the electrical signal and transmits the electrical signal to the display device 200. The communicator of the display device 200 may receive the voice signal and transmit the received voice signal to the voice receiver, and the voice receiver may receive the voice signal and convert the received voice signal into voice data that may be processed by the controller. The controller may process the voice data to identify the speaker and to recognize the word uttered by the user.

The voice recognition process may be performed through the server 300. When the speaker is identified, the display device 200 may search for the macro corresponding to the speaker, and may execute the macro function corresponding to the word uttered by the user.

Meanwhile, the display device 200 may recognize the voice uttered by the user to identify the trigger word for performing the macro function. For example, when the user utters 'sports mode', the display device 200 may recognize 'mode' as the trigger word for performing the macro function. The trigger word for performing the macro function may be a predetermined word, and may be designated by the user or be predetermined by a manufacturer of the display device. In addition, the trigger word may also be determined by the voice recognition server by inference through a statistical method even though there is no separate user input.

The display device 200 may perform the macro function by recognizing the word 'sports' in front of the trigger word to search for a macro to be executed, and searching for a macro corresponding to 'sports'. In this case, the display device 200 may generate a guide for the performed macro function, and may output (601) the guide as voice or display (603) the guide on the screen.

According to an exemplary embodiment, the display device 200 may receive the voice uttered by the user through the embedded microphone.

Figure 7:
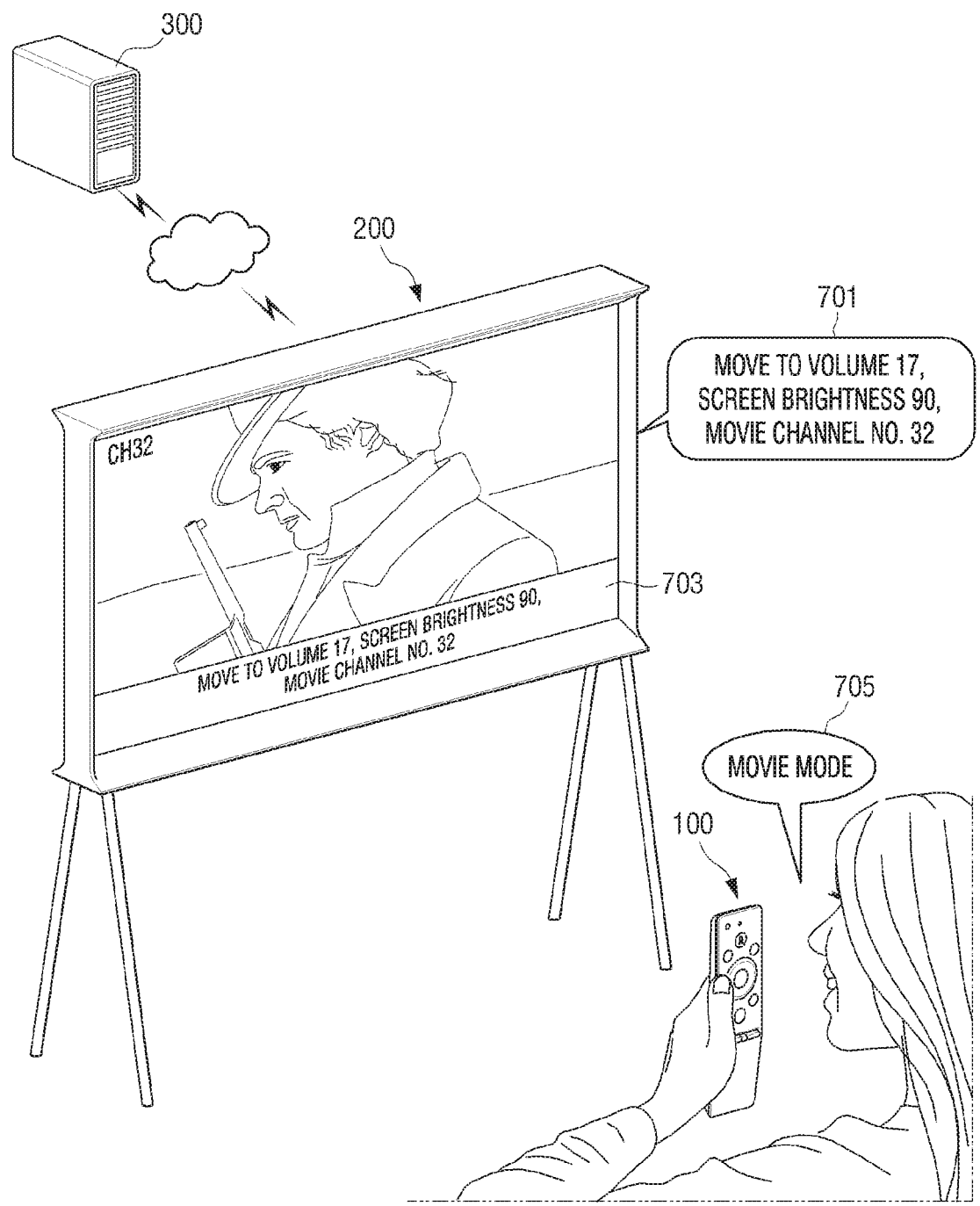
FIG. 7 illustrates another example in which the display device according to an exemplary embodiment of the present disclosure executes a macro function in accordance with voice uttering of a user.

FIG. 7 illustrates another example in which the display device according to an exemplary embodiment of the present disclosure executes a macro function in accordance with voice uttering of a user.

When the user utters (705) the voice through the microphone embedded in the remote controller 100, the display device 200 may recognize the voice uttered by the user to identify the trigger word for performing the macro function. For example, when the user utters 'movie mode 705', the display device 200 identifies the speaker from the word uttered by the user, and determines whether or not the trigger word for performing the macro function is included in the word uttered by the user.

That is, the display device may identify the trigger word 'mode' and the domain 'movie' by recognizing the voice of the user who utters 'movie mode', search the macro of the user corresponding to the identified trigger word and domain, and execute the macro function.

In this case, the display device may generate a guide for the performed macro function, and may output (701) the guide as voice or display (703) the guide on the screen.

The methods according to the exemplary embodiments of the present disclosure may be implemented in a form of program instructions that may be executed through various computer means and may be recorded in a computer-readable medium. The computer-readable medium may include program instructions, data files, data structures, or the like, alone or a combination thereof. For example, the computer-readable medium may include a volatile or non-volatile storage such as a read only memory (ROM), a memory such as a random access memory (RAM), a memory chip, a device, or an integrated circuit, or an optically or magnetically recordable and machine (e.g., computer) readable storage medium, such as a compact disk (CD), a digital versatile disk (DVD), a magnetic disk, a magnetic tape, or the like, regardless of whether data are erasable or rewritable. It may be appropriated that a memory that may be included in a mobile terminal is an example of a machine readable storage medium suitable for storing a program or programs including instructions implementing the exemplary embodiments of the present disclosure. The program instructions recorded in the computer-readable recording medium may be especially designed and configured for the present disclosure or be known to those skilled in a field of computer software.

Although the present disclosure has been described with reference to the exemplary embodiments and the accompanying drawings, the present disclosure is not limited to the above-mentioned exemplary embodiments, but may be variously modified and changed from the above description by those skilled in the art to which the present disclosure pertains.

Therefore, the scope of the present disclosure is not construed as being limited to the exemplary embodiments described above, but should be defined by the following claims as well as equivalents thereto.

The invention claimed is:

1. A display device comprising:
   a storage;
   a display;
   a voice receiver; and
   a controller configured to:
      based on a first user voice input being received through the voice receiver, performing a function corresponding to the first user voice input,
      store, in the storage, log data corresponding to the first user voice input, information corresponding to a content displayed on the display and a setting value of the display device,
      identify the log data by a voice pattern of the first user voice input and a type of the content as each macro included in a plurality of macros,
      based on a second user voice input including a predetermined keyword corresponding to a type of a content being received through the voice receiver, identify a macro corresponding to a voice pattern of the second user voice input and the type of the content from among the plurality of macros, and
      based on the macro being identified, perform a function for controlling a setting value of the display device.

2. The display device as claimed in claim 1, wherein the controller is configured to control the display to display guide information on the identified macro.

3. The display device as claimed in claim 1, the display device further comprising an audio outputter,
   wherein the controller is configured to control the audio outputter to output guide information on the identified macro.

4. The display device as claimed in claim 1, wherein the voice receiver comprises a microphone, and
   wherein the first user voice input or the second user voice input is received through the microphone.

5. The display device as claimed in claim 1, wherein the voice receiver comprises a communicator, and
   wherein the first user voice input or the second user voice input is received from an external device through the communicator.

6. The display device as claimed in claim 1, wherein the log data includes at least one of an operation time of the display device, a date, channel information, screen brightness, volume size, contents information, and a voice pattern of a user operating the display device.

7. The display device as claimed in claim 1, wherein the controller is configured to:
   identify the log data for each user of a plurality of users based on the voice pattern of the first user voice input and a type of a content, as the each macro included in the plurality of macros.

8. The display device as claimed in claim 1, wherein the controller is configured to identify whether or not the received second user voice input includes a trigger word for performing a macro function.

9. The display device as claimed in claim 8, wherein the controller is configured to, based on the second user voice input including the predetermined keyword corresponding to the type of the content and the trigger word being received through the voice receiver, identify the macro corresponding to the voice pattern of the second user voice input and the type of the content from among the plurality of macros.

10. A method for controlling a display device, the method comprising:
    based on a first user voice input being received through a voice receiver, performing a function corresponding to the first user voice input;
    storing log data corresponding to the first user voice input, information corresponding to a content displayed on the display device and a setting value of the display device;
    identifying the log data by a voice pattern of the first user voice input and a type of the content as each macro included in a plurality of macros;
    based on a second user voice input including a predetermined keyword corresponding to a type of a content being received through the voice receiver, identifying a macro corresponding to a voice pattern of the second user voice input and the type of the content from among the plurality of macros; and
    based on the macro being identified, performing a function for controlling a setting value of the display device.

11. The method as claimed in claim 10, the method further comprising:
    displaying guide information on the identified macro on a display of the display device.

12. The method as claimed in claim 10, the method further comprising:
    outputting guide information on the identified macro as a voice signal through a speaker of the display device.

13. The method as claimed in claim 10, wherein the voice receiver comprises a microphone, and
    wherein the first user voice input or the second user voice input is received through the microphone.

14. The method as claimed in claim 10, wherein the voice receiver comprises a communicator, and
    wherein the first user voice input or the second user voice input is received from an external device through the communicator.

15. The method as claimed in claim 10, wherein the log data includes at least one of an operation time of the display device, a date, channel information, screen brightness, volume size, contents information, and a voice pattern of a user operating the display device.

16. The method as claimed in claim 10, the method further comprising:
    identifying the log data for each user of a plurality of users based on the voice pattern of the first user voice input and a type of a content, as the each macro included in the plurality of macros.

17. The method as claimed in claim 10, the method further comprising:
    identifying whether or not the received second user voice input includes a trigger word for performing a macro function.

18. The method as claimed in claim 17, wherein the identifying the macro comprises:
    based on the second user voice input including the predetermined keyword corresponding to the type of the content and the trigger word being received through the voice receiver, identifying the macro corresponding to the voice pattern of the second user voice input and the type of the content from among the plurality of macros.

19. A display device comprising:
a storage;
a display;
a speaker;
a voice receiver; and
a controller configured to:
based on a first user voice input being received through the voice receiver, performing a function corresponding to the first user voice input,
store, in the storage, log data corresponding to the first user voice input, information corresponding to a content displayed on the display, a brightness of the display and a sound volume of the speaker when the content is displayed on the display,
identify the log data classified according to a voice pattern of the first user voice input and a type of the content as each macro included in a plurality of macros,
based on a second user voice input being received through the voice receiver, identify whether a trigger word included in the received second user voice input,
based on the trigger word included in the received second user voice input being identified, identify a type of a content corresponding to a predetermined keyword included in the received second user voice input,
identify a macro corresponding to a voice pattern of the second user voice input and the identified type of the content from among the plurality of macros, and
based on the macro being identified, perform a function for controlling a setting value of the display device.

20. The display device as claimed in claim 19, wherein the controller is configured to, based on the macro being identified, control the display to display a channel corresponding to the identified type of the content.

* * * * *